United States Patent Office 2,914,154
Patented Nov. 24, 1959

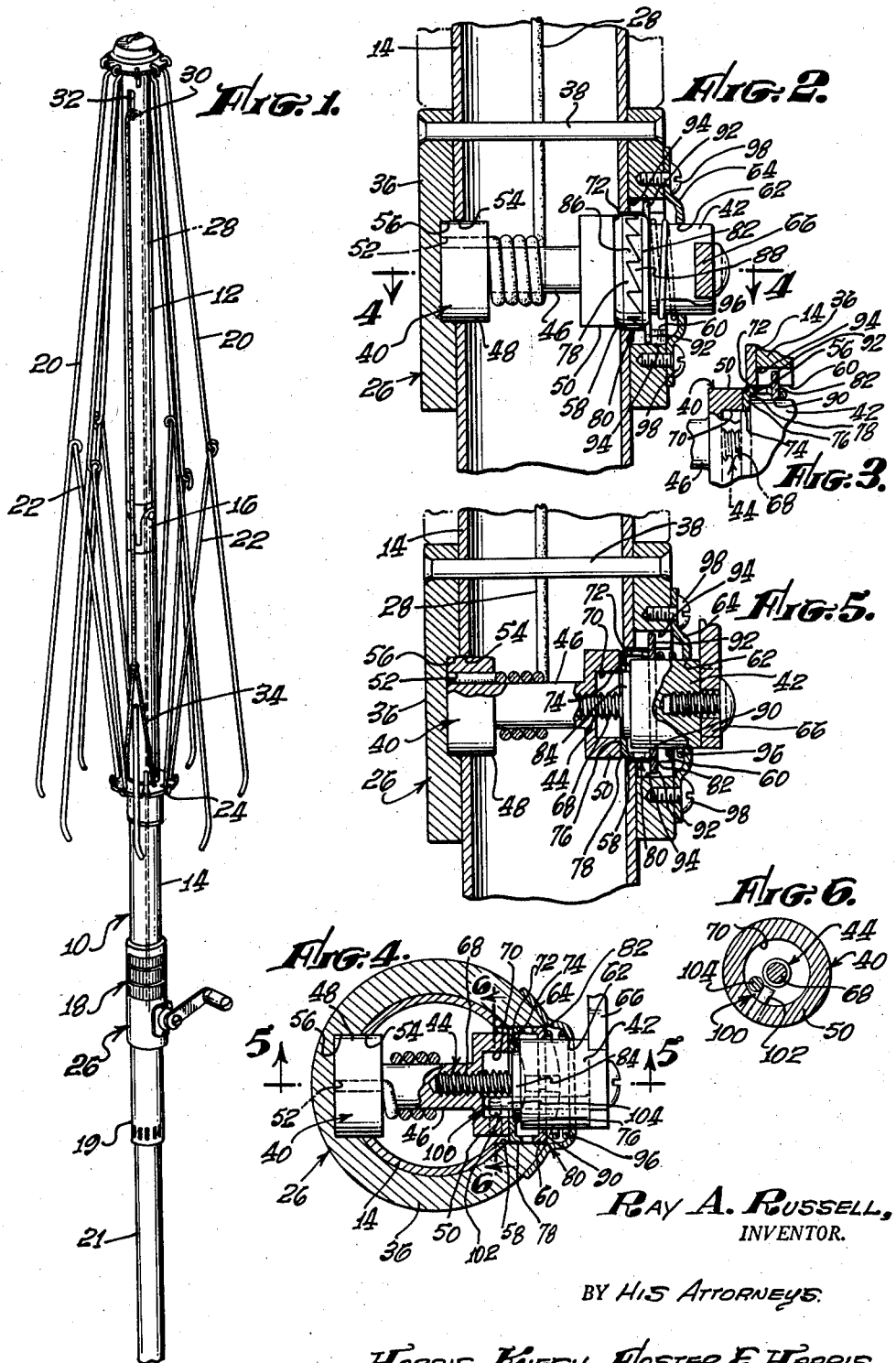

2,914,154

UMBRELLA WINCH

Ray A. Russell, Santa Ana, Calif., assignor to California Umbrella Company, Santa Ana, Calif., a partnership Application September 12, 1958, Serial No. 760,675

4 Claims. (Cl. 192—15)

The present invention relates in general to umbrellas, especially large umbrellas of the so-called beach or garden variety, and relates more particularly to an umbrella of this type having a novel winch for raising and lowering the canopy thereof.

A primary object of the invention is to provide a winch which is capable of being mounted on the staff of the umbrella in concentric relation therewith, which includes a driven member connected to the canopy and ratchet means for locking the driven member against reversed rotation so as to lock the canopy in a raised position, which includes means responsive to reversed rotation of a driving member connected to the driven member for rendering the ratchet means ineffective to prevent reversed rotation of the driven member, and which includes a driving connection between the driven member and the driving member capable of transmitting rotation of the driving member to the driven member in either direction, i.e., in the direction opposite to that in which the ratchet means acts, as well as in the direction in which the ratchet means acts.

Generally speaking, the invention contemplates a winch which includes coaxial driving and driven members, a threaded connection between the driving and driven members, interengageable ratchet elements, means biasing one of the ratchet elements into engagement with the other, and clutch means responsive to tightening of the threaded connection between the driving and driven members for locking the driving and driven members and said one ratchet element together for concomitant rotation.

An important object of the invention is to provide a winch of the foregoing nature which includes interengageable stop means on the driving and driven members and responsive to loosening of the threaded connection between the driving and driven members for locking such members together, without, however, locking said one ratchet element thereto.

Thus, with the foregoing construction, the clutch means transmits rotation of the driving member in one direction to the driven member, and at the same time rotates said one ratchet element relative to the other so that the ratchet elements cooperate to prevent reversed rotation of the driven member, thereby locking the canopy in the desired raised position. However, by reversing the direction of rotation of the driving member to loosen the threaded connection between the driving and driven members, said one ratchet element is disengaged from the driving member and the driving and driven members are again locked together so that the driven member is positively driven in the reverse direction despite the presence of the ratchet means.

Another object is to provide a ratchet means which includes tubular ratchet elements telescoped over one of the driving and driven members, said one ratchet element having a radially inwardly extending annular flange disposed between annular shoulders on the driving and driven members which are moved toward each other upon tightening of the threaded connection between the driving and driven members. The other ratchet element is biased into engagement with said one ratchet element by a spring encircling the corresponding one of the driving and driven members.

Another object is to incorporate the winch hereinbefore outlined in a tubular housing within which the driven member is disposed and which is mountable on the umbrella staff.

The foregoing objects, advantages, features and results of the present invention, together with various other objects, advantages, features and results thereof which will be evident to those skilled in the art to which the invention pertains, may be achieved with the exemplary embodiment described in detail hereinafter and illustrated in the accompanying drawing, in which:

Fig. 1 is a perspective view of an umbrella incorporating a winch which embodies the invention;

Fig. 2 is an enlarged view, partially in elevation and partially in longitudinal section, of the winch in position on the umbrella staff, a clutch means incorporated in the winch being engaged;

Fig. 3 is a fragmentary view duplicating a portion of Fig. 2 in section;

Fig. 4 is a transverse sectional view taken along the arrowed line 4—4 of Fig. 2 and showing the clutch means disengaged;

Fig. 5 is a longitudinal sectional view taken along the arrowed line 5—5 of Fig. 4; and Fig. 6 is a fragmentary sectional view taken along the arrowed line 6—6 of Fig. 4.

Referring particularly to Fig. 1 of the drawing, the numeral 10 designates a tubular umbrella staff including an upper section 12 and a lower section 14 interconnected by a hinge 16 by means of which the upper section 12 may be tilted relative to the lower section 14 to tilt a canopy, not shown, carried by the upper section, as more fully disclosed in my Patent No. 2,475,406, issued July 5, 1949. The lower section 14 of the staff 10 carries actuating means 18 for operating mechanism, not shown, within the staff which tilts the upper section 12 relative to the lower section 14, and is provided at its lower end with a socket 19 for a pole 21, or the like.

Pivotally connected to the upper section 12 of the staff 10 adjacent the upper end thereof are ribs 20 to which the canopy may be attached in a well-known manner. Pivotally connected to the ribs 20 intermediate their ends are braces 22 which, in turn, are pivotally connected to a collar 24 slidable on the staff 10 from a lower position below the hinge 16 to an upper position thereabove, such lower and upper positions of the collar 24 respectively corresponding to the lowered and raised positions of the umbrella canopy.

Mounted on the lower section 14 of the staff 10 below the actuating means 18 is a winch 26 of the invention for raising and lowering the canopy of the umbrella, this winch being connected to the collar 24 by a flexible cord or cable 28 which passes upwardly from the winch through the lower section 14 of the staff 10, through the hinge 16, through the upper section 12 of the staff, over a pulley 30 within the upper section 12 adjacent the upper end thereof, out an opening 32 in the upper staff section 12, and downwardly externally of the staff to the collar 24, being connected to the collar by a bridle 34. The cable 28, in passing upwardly through the tubular staff 10, also passes upwardly through the actuating means 18 for operating the tilting mechanism, and passes through such tilting mechanism itself. It will be understood that the actuating means 18, the tilting mechanism within the staff 10, and the hinge 16 are provided with passages therethrough for the cable 28.

Considering the winch 26 in more detail, it includes a tubular housing 36 which is mounted on the lower staff section 14 in concentric relationship therewith, the tubular housing 36 being telescoped over the lower staff section in the construction illustrated and being suitably secured thereto, as by a pin 38. Rotatable about an axis which coincides with a diameter of the tubular housing 36 are a driven member 40 and a driving member 42, there being a threaded connection 44 between these members which will be described in more detail hereinafter.

The driven member 40 consists of a reel having a hub 46 about which the cable 28 is adapted to be wound and having cylindrical heads 48 and 50 at the respective ends of the hub which act to confine the convolutions of the cable therebetween. The cable 28 is anchored with respect to the driven member 40 in any suitable manner, as by inserting an end thereof into a hole 52 in the head 48 and suitably securing it therein.

The head 48 extends through an opening 54 in the lower staff section 14 into and is journalled in a cylindrical bearing socket 56 in the tubular housing 36, such bearing socket rotatably supporting one end of the driven member-driving member assembly. The other end of such assembly extends through an opening 58 in the lower staff section 14 and an opening 60 in the tubular housing 36 into and is journalled in a bearing opening 62 in a cover plate 64, the periphery of the bearing opening 62 engaging the periphery of the driving member 42, which projects outwardly beyond the cover plate and which has a suitable handle 66 connected thereto.

Considering the threaded connection 44, it is shown as including a stud 68 fixedly mounted on the driving member 42 and threaded into the hub 46 of the driven member 40, this stud extending into the hub 46 through a cavity 70 in the head 50 of the driven member. Preferably, the thread on the stud 68 and the mating thread in the hub 46 of the driven member 40 are right-hand threads, although this is not essential.

With the foregoing construction, when the handle 66 is rotated in the clockwise direction to rotate the driving member 42 in such direction, the threaded connection 44 is tightened and draws the driving member 42 toward the driven member 40. This has the effect of moving closer together annular shoulders 72 and 74 respectively formed on the head 50 of the driven member 40 and on the driving member 42. Disposed between the annular shoulders 72 and 74, and adapted to be clamped therebetween, is a radially-inwardly-extending annular flange 76 of a tubular, or, more accurately, a cup-shaped, ratchet element 78 forming part of a ratchet means 80 which includes a second ratchet element or pawl 82. The inner periphery of the flange 76 of the ratchet element 78 rides on a cylindrical boss 84 of the driving member 42.

The ratchet element 78 has axially facing ratchet teeth 86 and the pawl 82 has complementary ratchet teeth 88 over which the ratchet teeth 86 are adapted to ride in response to rotation of the ratchet element 78 in the clockwise direction, viewed from the handle end of the driving member 42. The pawl 82 is provided with a radially-inwardly-extending annular flange 90 the inner periphery of which rides on the driving member 42 to support the pawl, rotation of the pawl being prevented by lugs 92 extending outwardly therefrom into complementary recesses 94 in the tubular housing 36. The pawl 82 is biased into engagement with the ratchet element 78 by a compression coil spring 96 which encircles the driving member 42 and which is seated at one end against the pawl 82 and at its other end against the cover plate 64. This plate is suitably secured to the tubular housing 36, as by screws 98.

Considering the operation of the winch 26 of the invention as thus far described, it will be apparent that if the handle 66 is rotated in the clockwise direction, as viewed from the handle end of the driving member 42, the threaded connection 44 is tightened to clamp the annular flange 76 of the ratchet element 78 between the annular shoulders 72 and 74 of the driven and driving members 40 and 42. This construction thus acts as a clutch means for locking the driven and driving members 40 and 42 and the ratchet element 78 together in response to rotation of the driving member 42 in a direction to tighten the threaded connection 44, which direction is the clockwise one in the construction hereinbefore described. Once the driven and driving members 40 and 42 and the ratchet element 78 have been locked together in this manner, continued rotation of the handle 66 results in rotation of the driven member 40 to wind up the cable 28 thereon so as to raise the umbrella canopy, and results in rotation of the ratchet element 78 relative to the pawl 82 to hold the canopy in any position to which it is raised.

It will be apparent that, if the handle 66 is rotated in the opposite direction, i.e., in the counterclockwise direction as viewed from the handle end of the driving member 42, the threaded connection 44 is loosened to disengage the clutch means formed by the annular flange 76 of the ratchet element 78 and the annular shoulders 72 and 74 of the driven and driving members 40 and 42. Consequently, the threaded connection 44 does not transmit rotation of the driving member 42 in the counterclockwise direction to the driven member 40.

An important feature of the invention is to provide means 100 for transmitting reversed, i.e., counterclockwise, rotation of the driving member 42 to the driven member 40 upon loosening of the threaded connection 44 sufficiently to disengage the clutch means formed by the annular flange 76 and the annular shoulders 72 and 74. The means 100 comprises interengageable stops or stop means 102 and 104 respectively carried by the driven and driving members 40 and 42, the stops 102 and 104 being engageable to transmit reversed rotation of the driving member 42 to the driven member 40 after reversed rotation of the driving member relative to the driven member sufficient to disengage the clutch means mentioned. Normally, less than one revolution of the driving member 42 relative to the driven member 40 is sufficient for this purpose, depending upon the pitch of the threaded connection 44.

In the construction shown, the stop 102 on the driven member 40 comprises a radial pin which extends radially inwardly into the cavity 70 in the head 50 of the driven member. The stop 104 on the driving member 42 comprises a longitudinal pin, i.e., a pin extending parallel to the axis of rotation of the winch 26, which is fixed on the driving member 42 and which is engageable with the pin 102.

The advantage of providing a driving connection, by means of the stops 102 and 104, between the driving member 42 and the driven member 40 upon reversed rotation of the driving member is that it permits the umbrella canopy to move downwardly freely, there being no necessity for relying on the weight of the umbrella canopy in an attempt to overcome friction in the winch 26.

Although an exemplary embodiment of the invention has been disclosed herein for purposes of illustration, it will be understood that various minor changes, modifications and substitutions may be incorporated in such embodiment without departing from the spirit of the invention as defined by the claims which follow.

I claim:

1. In combination: coaxial driving and driven members having axially spaced annular shoulders which face each other; a threaded connection between said driving and driven members, said annular shoulders moving toward each other upon tightening of said threaded connection; tubular, sleeve-like ratchet elements telescoped over said driving member and having interengageable ends respectively provided with axially facing ratchet teeth thereon, one of said ratchet elements being cup-shaped and having a radially inwardly extending annular flange disposed between said annular shoulders, said annular flange being clamped between said annular shoulders upon tightening of said threaded connection so as to lock said driving and driven members and said one ratchet element together; means biasing the other of said ratchet elements into engagement with said one ratchet element; and interengageable stop means on said driving and driven members and responsive to loosening of said threaded connection for locking said driving and driven members together.

2. In combination: coaxial driving and driven members having axially spaced annular shoulders which face each other; a threaded connection between said driving and driven members, said annular shoulders moving toward each other upon tightening of said threaded connection; tubular, sleeve-like ratchet elements telescoped over said driving member and having interengageable ends respectively provided with axially facing ratchet teeth thereon, one of said ratchet elements being cup-shaped and having a radially inwardly extending annular flange disposed between said annular shoulders, said annular flange being clamped between said annular shoulders upon tightening of said threaded connection so as to lock said driving and driven members and said one ratchet element together; means biasing the other of said ratchet elements into engagement with said one ratchet element; and interengageable stop means on said driving and driven members and responsive to loosening of said threaded connection for locking said driving and driven members together, said driven member having a cavity therein and said stop means respectively including interengageable stops extending into said cavity and respectively carried by said members.

3. In combination: a tubular housing; driving and driven members carried by said tubular housing and rotatable about an axis which coincides with a diameter of said tubular housing, said driving member having an end projecting from said tubular housing and said driven member being disposed entirely within said tubular housing, said driving and driven members having axially spaced annular shoulders within said tubular housing which face each other; a threaded connection between said driving and driven members, said annular shoulders moving toward each other upon tightening of said threaded connection; ratchet elements telescoped over one of said members within said tubular housing, one of said ratchet elements having an annular portion which extends radially inwardly toward said axis and which is disposed between said annular shoulders, said annular portion of said one ratchet element being clamped between said annular shoulders upon tightening of said threaded connection so as to lock said driving and driven members and said one ratchet element together; means biasing the other of said ratchet elements into engagement with said one ratchet element; and interengageable stop means on said driving and driven members and responsive to loosening of said threaded connection for locking said driving and driven members together.

4. A combination according to claim 3 wherein said driven member is a spool having a cord connected thereto and adapted to be wrapped therearound and projecting from one end of said tubular housing.

References Cited in the file of this patent

UNITED STATES PATENTS

| | | |
|---|---|---|
| 1,010,574 | Bird et al. | Dec. 5, 1911 |
| 1,170,653 | Marette | Feb. 8, 1916 |
| 2,593,872 | Gohde | Apr. 22, 1952 |